(12) United States Patent  
Okamura et al.

(10) Patent No.: US 9,956,619 B2  
(45) Date of Patent: May 1, 2018

(54) CUTTING INSERT AND CUTTING TOOL

(71) Applicant: Sumitomo Electric Hardmetal Corp., Itami-shi (JP)

(72) Inventors: Katsumi Okamura, Itami (JP); Yosuke Korogi, Kishima-gun (JP); Naoki Watanobe, Itami (JP); Nozomi Tsukihara, Itami (JP); Hiroki Yonekura, Kishima-gun (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 203 days.

(21) Appl. No.: 14/434,876

(22) PCT Filed: Oct. 9, 2013

(86) PCT No.: PCT/JP2013/077507  
§ 371 (c)(1),  
(2) Date: Apr. 10, 2015

(87) PCT Pub. No.: WO2014/057985  
PCT Pub. Date: Apr. 17, 2014

(65) Prior Publication Data  
US 2015/0266100 A1 Sep. 24, 2015

(30) Foreign Application Priority Data  
Oct. 10, 2012 (JP) .................................. 2012-225173

(51) Int. Cl.  
*B23C 5/20* (2006.01)  
*B23B 27/14* (2006.01)

(52) U.S. Cl.  
CPC .... *B23B 27/145* (2013.01); *B23B 2200/0471* (2013.01); *B23B 2200/0476* (2013.01);  
(Continued)

(58) Field of Classification Search  
CPC . B23B 27/04; B23B 29/043; B23B 2200/165; B23B 2200/128; B23C 2200/128  
See application file for complete search history.

(56) References Cited

U.S. PATENT DOCUMENTS 4,294,566 A * 10/1981 Boone ................. B23B 27/1622  
                                                407/104  
5,310,293 A * 5/1994 Notter ..................... B23B 51/02  
                                                407/119  
(Continued)

FOREIGN PATENT DOCUMENTS

| CN | 1572399 A | 2/2005 |
| CN | 101668606 A | 3/2010 |

(Continued)

OTHER PUBLICATIONS

Notification of the Third Office Action in counterpart Chinese Patent Application No. 201380053253.9, dated Dec. 12, 2016.

(Continued)

*Primary Examiner* — Will Fridie, Jr.  
(74) *Attorney, Agent, or Firm* — Venable LLP; Michael A. Sartori; Laura G. Remus (57) ABSTRACT

A cutting tool includes a cutting insert that is held in a holder in a detachable manner. The cutting insert has a substantially regular quadrangular shape in plan view and includes four round corners. The cutting insert is formed of CBN sinter as a whole. The cutting insert includes two principal surfaces that are upper and lower surfaces opposite to each other, and four side surfaces that are arranged so as to connect the principal surfaces to each other. A boundary portion (ridge line portion) between each of the principal surfaces and each of the side surfaces forms a cutting edge. In a central portion of each of the side surfaces of the cutting insert, a groove for absorbing a crack, having a substantially V-shape in cross (Continued)

section, is formed all around the cutting insert so as to be recessed with respect to the side surfaces.

7 Claims, 12 Drawing Sheets

(52) U.S. Cl.
CPC ... *B23B 2200/125* (2013.01); *B23B 2200/128* (2013.01); *B23B 2200/3627* (2013.01); *B23B 2226/125* (2013.01); *B23C 2200/128* (2013.01); *Y10T 407/22* (2015.01); *Y10T 407/23* (2015.01); *Y10T 407/27* (2015.01)

(56) References Cited

U.S. PATENT DOCUMENTS

| | | | | |
|---|---|---|---|---|
| 5,405,711 | A * | 4/1995 | Noggle | B23B 27/143 407/114 |
| 5,443,334 | A * | 8/1995 | Pantzar | B23C 5/207 407/113 |
| 5,853,267 | A * | 12/1998 | Satran | B23C 5/202 407/113 |
| 9,144,848 | B2 * | 9/2015 | Konta | B23C 5/109 |
| 2004/0071515 | A1 * | 4/2004 | Arvidsson | B23C 5/109 407/113 |
| 2011/0305535 | A1 * | 12/2011 | Jansson | B23C 5/06 407/103 |
| 2012/0070239 | A1 * | 3/2012 | Park | B23C 5/06 407/42 |
| 2012/0076596 | A1 * | 3/2012 | Kim | B23C 5/1027 407/69 |
| 2012/0308317 | A1 * | 12/2012 | Choi | B23C 5/06 407/47 |
| 2014/0010608 | A1 * | 1/2014 | Lenischenko | B23B 27/145 407/114 |
| 2014/0178135 | A1 * | 6/2014 | Yamamoto | B23C 5/109 407/42 |
| 2015/0165532 | A1 * | 6/2015 | Yamamoto | B23C 5/202 407/67 |
| 2015/0266100 | A1 * | 9/2015 | Okamura | B23B 27/145 407/66 |
| 2016/0039015 | A1 * | 2/2016 | Matsubara | B23C 5/207 407/114 |

FOREIGN PATENT DOCUMENTS

| | | |
|---|---|---|
| CN | 102528141 A | 7/2012 |
| CN | 102781612 A | 11/2012 |
| DE | 19600172 A1 | 8/1997 |
| JP | S57-027603 A | 2/1982 |
| JP | H2-053303 U | 4/1990 |
| JP | H5-070805 U | 9/1993 |
| JP | H05-285708 A | 11/1993 |
| JP | 2009-131943 A | 6/2009 |
| JP | 2012-035341 A | 2/2012 |
| WO | WO-2010/101514 A1 | 9/2010 |
| WO | WO-2011/111197 A1 | 9/2011 |
| WO | WO-2012/021261 A1 | 2/2012 |

OTHER PUBLICATIONS

Notification of the First Office Action in Chinese Patent Application No. 201380053253.9, dated Jan. 11, 2016.
"Sumiboron/Sumidia Products Guide No. 020, Sumiboron BNS800, Fourth Edition", Sumitomo Electric Hardmetal Corporation, 7 total pages, dated Dec. 2007.
International Preliminary Report on Patentability in PCT International Application No. PCT/JP2013/077507, dated Apr. 23, 2015.
International Search Report in PCT International Application No. PCT/JP2013/077507, dated Jan. 7, 2014.
Extended European Search Report in European Application No. 13844764.4, dated Apr. 20, 2016.

* cited by examiner

CUTTING INSERT AND CUTTING TOOL

TECHNICAL FIELD

The present invention relates to a cutting insert and a cutting tool, such as a cutting insert and a cutting tool for cutting work material of high hardness.

BACKGROUND ART

There is known a conventional cutting insert, such as described in Non Patent Literature 1. The cutting insert includes two principal surfaces opposite to each other, and a side surface connecting each of principal surfaces to each other so that a boundary portion (ridge line portion) between each of the principal surfaces and the side surface forms a cutting edge. The entire cutting insert is formed of CBN sinter.

CITATION LIST

Non Patent Literature

Non Patent Literature 1: SUMIBORON/SUMIDIA products guide No. 020 SUMIBORON BNS800, Fourth Edition, Sumitomo Electric Hardmetal Corp.

SUMMARY OF INVENTION

Technical Problem

In a cutting insert composed of only CBN sinter such as that of the conventional art described above, since a boundary portion between each of principal surfaces and a side surface is available for a cutting edge all around the boundary portion, cost reduction can be achieved as a whole. However, since the CBN sinter is a high hardness material but a brittle material, the CBN sinter is inferior in ductility to allow a crack to easily develop. Thus, while a work material of high hardness is cut, example of a cutting edge on one of the principal surfaces of the cutting insert may break to cause a crack to occur in the side surface of the cutting insert. As a result, the crack may develop to the other of the principal surfaces of the cutting insert to disable a cutting edge on the other of the principal surfaces.

It is an object of the present invention to provide a cutting insert and a cutting tool in which when a cutting edge on one of principal surfaces breaks to cause a crack to occur in a side surface, it is possible to prevent the crack from developing to the other of the principal surfaces.

Solution to Problem

One aspect of the present invention relates to a cutting insert for cutting work material. The cutting insert includes two principal surfaces opposite to each other, and a side surface connecting each of the principal surfaces to each other, and in the cutting insert, a boundary portion between each of the principal surfaces and the side surface forms a cutting edge that is formed of CBN sinter as a whole, and the side surface is provided with a groove so that the groove is recessed with respect to the side surface.

In addition, another aspect of the present invention relates to a cutting tool provided with the cutting insert described above.

Advantageous Effects of Invention

According to the present invention, when a cutting edge on one of principal surfaces of a cutting insert breaks to cause a crack to occur in a side surface of the cutting insert, it is possible to prevent the crack from developing to the other of the principal surfaces of the cutting insert. Accordingly, it is possible to prevent a cutting edge on the other of the principal surfaces of the cutting insert from breaking.

DESCRIPTION OF EMBODIMENTS

Description of Embodiments of the Present Invention

First, contents of the embodiments of the present invention listed below will be described.

One aspect of the present invention relates to a cutting insert for cutting work material. The cutting insert includes two principal surfaces opposite to each other, and a side surface connecting each of the principal surfaces to each other, and in the cutting insert, a boundary portion between each of the principal surfaces and the side surface forms a cutting edge that is formed of CBN sinter as a whole, and the side surface is provided with a groove so that the groove is recessed with respect to the side surface.

In the cutting insert described above, when cutting of work material is performed, the boundary portion between each of the principal surfaces and the side surface of the cutting insert is used as the cutting edge. Here, since a groove is provided in the side surface of the cutting insert so as to be recessed with respect to the side surface, even if a cutting edge on one of the principal surfaces of the cutting insert breaks to cause a crack to occur in the side surface of the cutting insert while examples of work material of high hardness are cut, the crack is absorbed by the groove. Thus, according to the cutting insert, the crack does not reach the other of the principal surfaces.

In the cutting insert described above, the groove may be formed in all around the side surface. In such a structure, even in a case where a cutting edge of any portion of the cutting insert is used when work material is cut, if a crack occurs in the side surface of the cutting insert due to a break in the cutting edge, the crack is absorbed by the groove.

The cutting insert described above may include a plurality of round corners, and the groove may be formed in a side surface of each of the plurality of round corners. In a cutting insert provided with a plurality of round corners, cutting is performed by using a cutting edge of each of the round corners in many cases. Thus, it is preferable to form a groove in the side surfaces of the round corners, and in this case, it is possible to reduce cost of cutting the groove.

In the cutting insert described above, an angle between each of the principal surfaces and the side surface may be less than 90 degrees. In this case, a cutting edge has an acute angle, so that sharpness of the cutting edge is improved to reduce cutting resistance. In addition, the cutting insert is available for a case where under cutting, corner rounding turning, or the like is required for a work area of work material.

In the cutting insert described above, the groove is formed in a central portion of the side surface, and in a case where a thickness of the insert is indicated as "a", and a width of the groove is indicated as the following expression may be satisfied: $(a-b)/2 \geq 1$ mm. In this case, a distance from a tip of the cutting edge to the groove of each of the principal surface sides in the cutting insert is secured, so that it is possible to reduce strength reduction in the cutting edge.

In addition, another aspect of the present invention relates to a cutting tool provided with any one of the cutting inserts described above.

In such a cutting tool, the cutting insert described above is used, so that, as described above, even if a cutting edge on one of the principal surfaces of the cutting insert breaks to cause a crack to occur in the side surface of the cutting insert while examples of work material of high hardness are cut, the crack is absorbed in the groove. Thus, the crack does not reach the other of the principal surfaces of the cutting insert.

Detail of Embodiments of the Present Invention

Hereinafter, specific examples of a cutting insert and a cutting tool in accordance with embodiments of the present invention will be described with reference to the accompanying drawings. In the drawings, the same or a similar element is designated by the same reference numeral without duplicated description on the element. In addition, the present invention is not limited to the examples, and is intended to include all modifications that are shown in scope of Claims and in meaning and scope equivalent to those of Claims.

Figure 1:
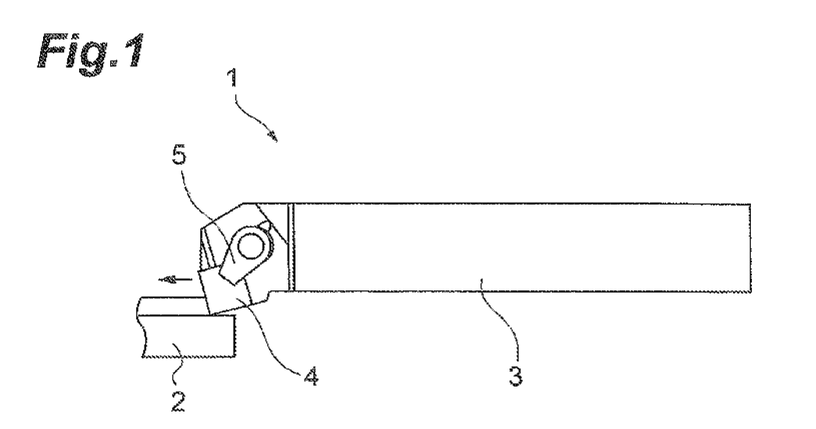
FIG. 1 is a schematic structural view showing a cutting tool that includes a first embodiment of a cutting insert in accordance with the present invention.

FIG. 1 is a schematic structural view showing a cutting tool that includes a first embodiment of a cutting insert in accordance with the present invention. In FIG. 1, a cutting tool 1 is a tool used for cutting work material (work) 2 of high hardness that applies high load to a cutting edge of the tool, such as an automobile component made of hardened steel.

The cutting tool 1 includes a holder 3, and a cutting insert 4. The cutting insert 4 is a member that is held at a tip of the holder 3 in a detachable manner to cut the work material 2. The holder 3 is provided with a clamp part 5 for pressing down the cutting insert 4.

Figure 2:
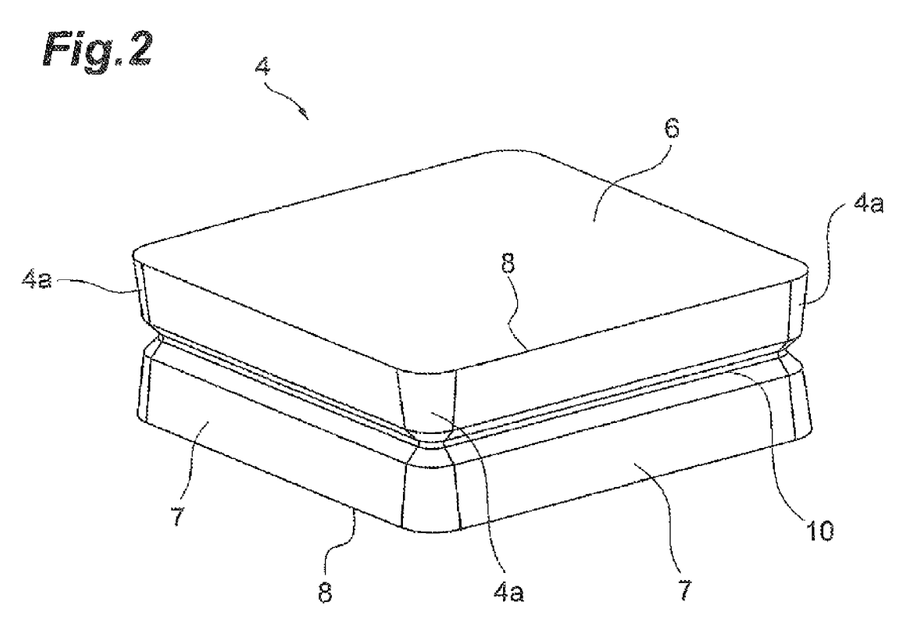
FIG. 2 is a perspective view showing the cutting insert shown in FIG. 1.
Figure 3:
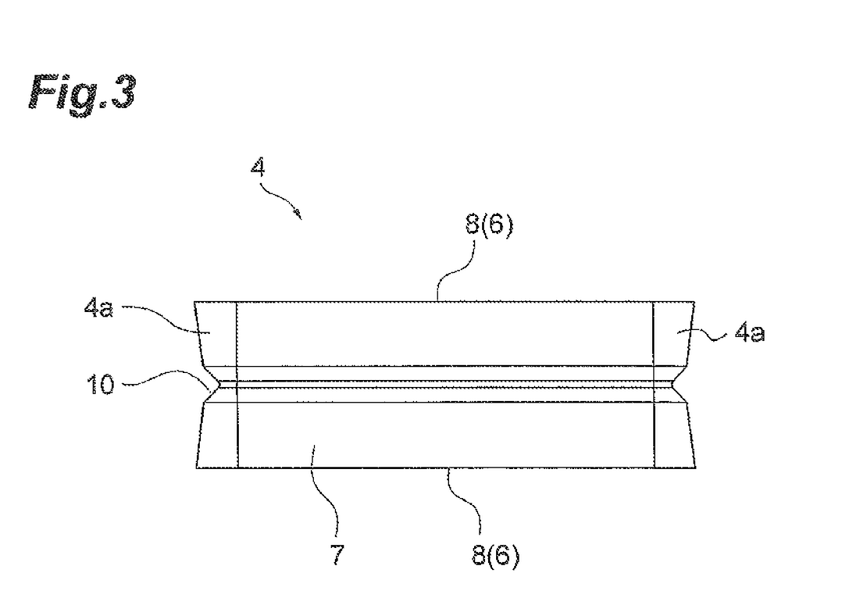
FIG. 3 is a side view showing the cutting insert shown in FIG. 2.

FIG. 2 is a perspective view of the cutting insert 4 of the present embodiment, and FIG. 3 is a side view showing the cutting insert 4 shown in FIG. 2. In FIGS. 2 and 3, the cutting insert 4 has a substantially regular quadrangular shape in plan view and includes four round corners 4a. The cutting insert 4 includes two principal surfaces 6 that are upper and lower surfaces opposite to each other, and four side surfaces 7 that are arranged so as to connect the principal surfaces 6 to each other. Both ends of each of the side surfaces 7 are formed into a curved shape. The cutting insert 4 has a thickness of examples of 3 mm to 5 mm.

The cutting insert 4 is a chip formed of cubic crystal boron nitride (CBN) sinter as a whole. Thus, the entire boundary portion (ridge line portion) between each of the principal surfaces 6 and each of the side surfaces 7 including each of the round corners 4a and other linear portions is to be used as the cutting edge 8. Thus, the cutting insert 4 is available for many kinds of cutting. The cutting edge 8 is composed of the boundary portion (ridge line portion) between each of the principal surfaces 6 and each of the side surfaces 7, a part of areas of each of the principal surfaces 6, and a part of areas of each of the side surface 7. Since the cutting insert 4 is composed of only the CBN sinter, it is possible to easily produce the cutting insert 4.

Figure 4:
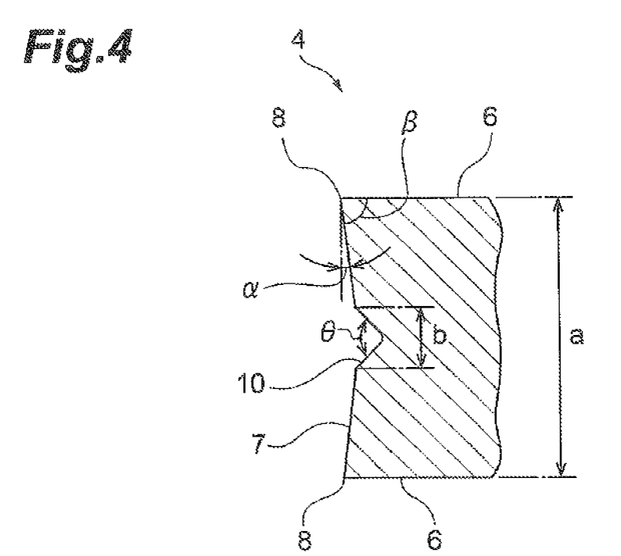
FIG. 4 is a cross sectional view showing the cutting insert shown in FIG. 2.

The cutting insert 4 is a chip that has a positive shape as a whole. Specifically, as shown in FIG. 4, each of the side surfaces 7 of the cutting insert 4 is not perpendicular to each of the principal surfaces 6 of the cutting insert 4, and is a tapered surface inclined toward the center in a thickness direction of the cutting insert 4. The side surface 7 has a taper angle α from an example of 7 degrees to 11 degrees. That is, an angle (a tip angle of the cutting edge 8) β between each of the principal surfaces 6 and each of the side surfaces 7 is from an example of 79 degrees to 83 degrees.

As above, since the tip angle β of the cutting edge 8 is formed less than 90 degrees (acute angle), the cutting edge 8 has improved sharpness to reduce cutting resistance of the cutting edge 8. In particular, when plunge cutting by using the cutting edge 8 of the linear portion of the cutting insert 4 is performed, reducing action on the cutting resistance is effectively exerted. In addition, although the cutting insert 4 has a positive shape, the cutting edges 8 on both of the principal surfaces 6 are usable to achieve economic advantage. Further, it is possible to apply under cutting and corner rounding turning to the work material 2.

In a central portion of each of the side surfaces 7 of the cutting insert 4, a groove 10 having a substantially V-shape in cross section is formed all around the cutting insert 4 so as to be recessed with respect to the side surfaces 7. The groove 10 is a structure for absorbing a crack (described later) that may occur in the side surfaces 7 of the cutting insert 4. The groove 10 is formed by an example of using a grindstone that works easily. Thus, as shown in FIG. 4, a bottom of the groove 10 is formed into an round shape that is hardly broken. An angle θ between both side surfaces of the groove 10 is about 90 degrees.

It is preferable that, in a case where a thickness of the cutting insert 4 (insert thickness) is indicated as "a" (mm), and a width of the groove 10 is indicated as "b" (mm), the cutting insert 4 is formed to satisfy the following expression: $(a-b)/2 \geq 1$ mm. In this case, a length between a tip of the cutting edge 8 and the groove 10 is 1 mm or more in the cutting insert 4, so that it is possible to sufficiently secure strength of the cutting edge 8.

When cutting of the work material 2 is performed by using the cutting tool 1 as above, the cutting insert 4 is positioned at a prescribed place in the tip of the holder 3 to cut the work material 2 with the cutting edge 8 of the cutting insert 4 while the work material 2 is rotated in a state where one of the principal surfaces 6 of the cutting insert 4 is pressed and held by the clamp part 5.

The CBN sinter being material of the cutting insert 4 has high hardness but has inferior ductility as compared with cemented carbide because the CBN sinter is brittle material, so that the CBN sinter has properties in which a crack easily develops. Thus, if the cutting edge 8 is broken to cause a crack to occur in the side surface 7 of the cutting insert 4 while the example of work material 2 of high hardness is cut by using the cutting edge 8 on one of the principal surfaces 6 of the cutting insert 4, the crack extends toward the other of the principal surfaces 6 of the cutting insert 4.

However, in the present embodiment, the groove 10 for absorbing a crack is formed in the central portion of the side surface 7 of the cutting insert 4 all around the cutting insert 4, so that even if the cutting edge 8 on one of the principal surfaces 6 of the cutting insert 4 is broken to cause a crack to occur in the side surface 7 of the cutting insert 4 while the example of work material 2 of high hardness is cut, for example, and the crack extends toward the other of the principal surfaces 6, the crack stops developing in the groove 10. Accordingly, since a crack that occurs due to a break in the cutting edge 8 on one of the principal surfaces 6 of the cutting insert 4 does not reach the other of the principal surfaces 6, it is possible to prevent the cutting edge 8 on the other of the principal surfaces 6 from breaking. As a result, it is possible to improve durability of the cutting insert 4 to allow the cutting insert 4 to be usable for a long period.

When cutting is performed by using the cutting tool 1, a feed rate of the cutting insert 4 per one rotation of the work material 2 is required to be set so that a crack that occurs due to a break in the cutting edge 8 of the cutting insert 4 reliably stops developing in the groove 10. In a case where an example of a width b of the groove 10 is 1.0 mm, and a depth of the groove 10 is 0.5 mm, the example of feed rate of the cutting insert 4 per one rotation of the work material 2 is set less than 0.5 mm of the depth of the groove 10.

Figure 5:
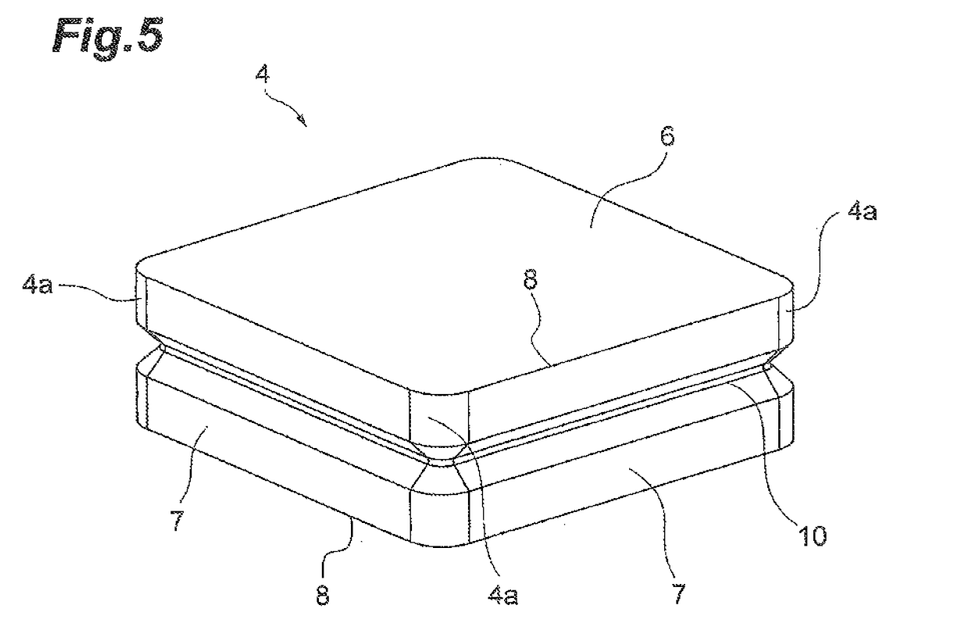
FIG. 5 is a perspective view showing a second embodiment of the cutting insert in accordance with the present invention.
Figure 6:
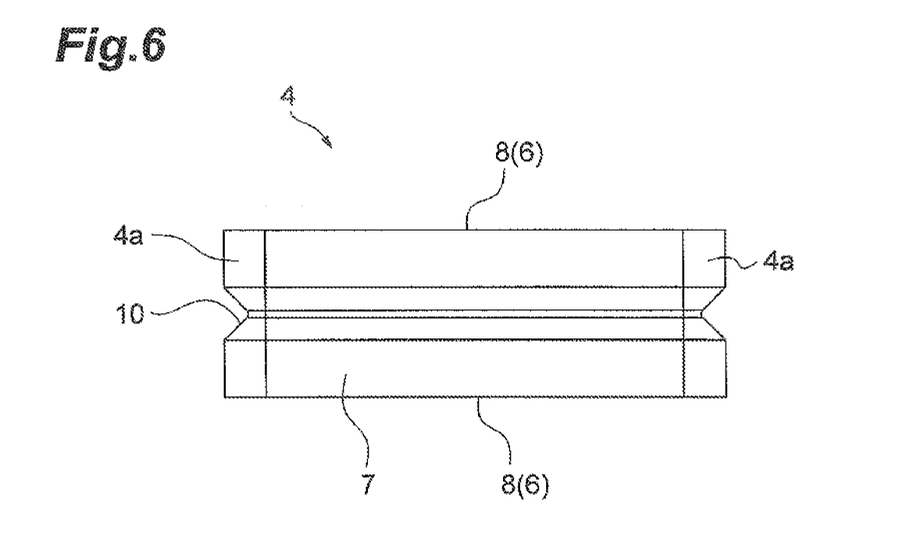
FIG. 6 is a side view of the cutting insert shown in FIG. 5.

FIG. 5 is a perspective view showing a second embodiment of the cutting insert in accordance with the present invention, and FIG. 6 is a side view of the cutting insert 4 shown in FIG. 5. In FIGS. 5 and 6, the cutting insert 4 of the present embodiment has a substantially regular quadrangular shape in plan view as with the first embodiment described above as well as is formed of CBN sinter as a whole.

Unlike the first embodiment described above, the cutting insert 4 of the second embodiment is a chip that has a negative shape as a whole. Specifically, each of the side surfaces 7 of the cutting insert 4 is perpendicular to each of the principal surfaces 6 of the cutting insert 4. That is, a tip angle of the cutting edge 8 is 90 degrees (a right angle). Another structure is the same as that of the first embodiment described above.

Even in the cutting insert 4 of the second embodiment, since a crack that occurs due to a break in the cutting edge 8 on one of the principal surfaces 6 does not reach the other of the principal surfaces 6 by absorption by the groove 10, it is possible to prevent the cutting edge 8 on the other of the principal surfaces 6 from breaking.

Figure 7:
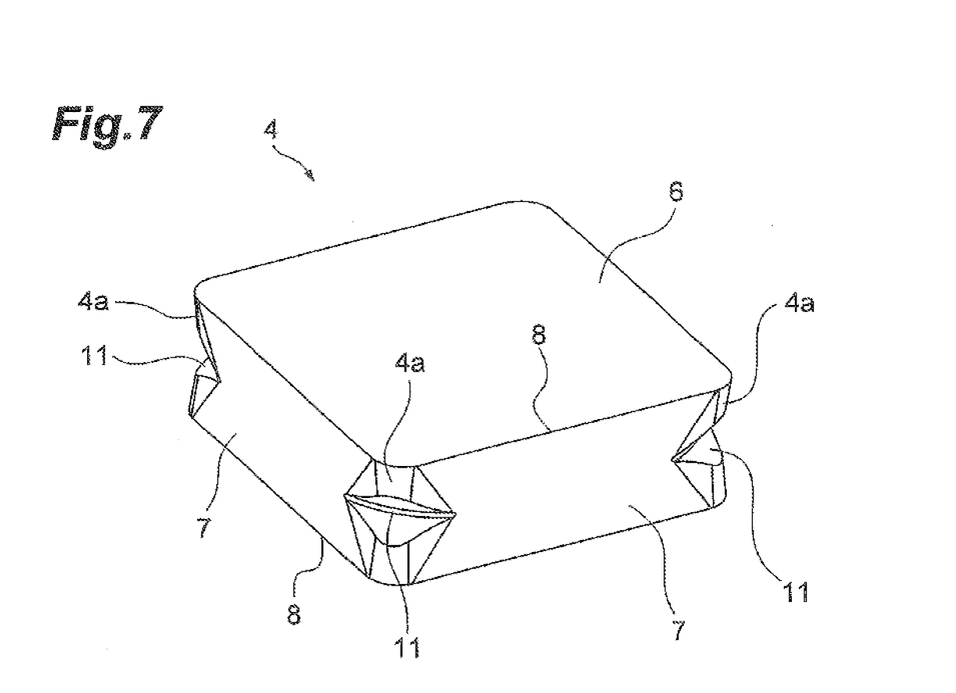
FIG. 7 is a perspective view showing a third embodiment of the cutting insert in accordance with the present invention.
Figure 8:
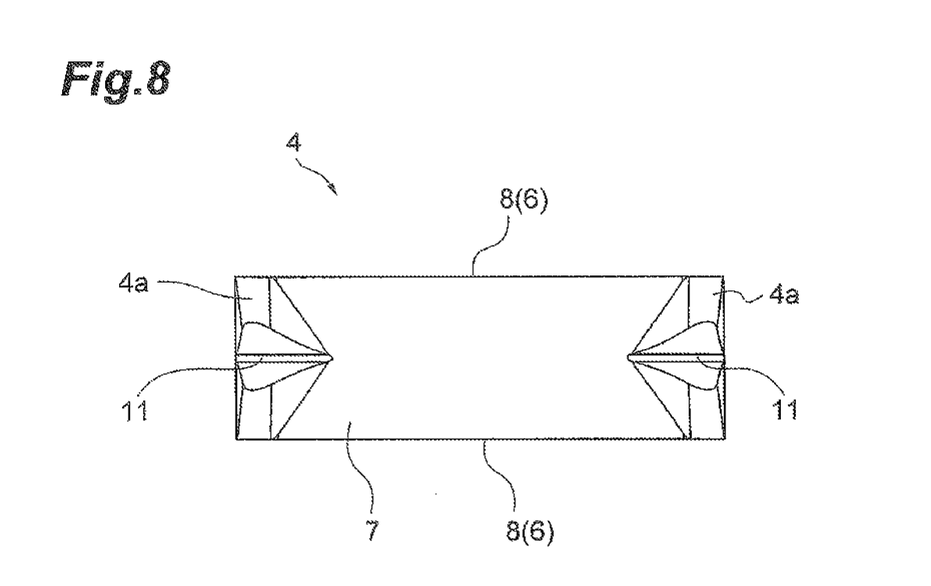
FIG. 8 is a side view of the cutting insert shown in FIG. 7.

FIG. 7 is a perspective view showing a third embodiment of the cutting insert in accordance with the present invention, and FIG. 8 is a side view of the cutting insert 4 shown in FIG. 7. In FIGS. 7 and 8, the cutting insert 4 of the third embodiment has a substantially regular quadrangular shape in plan view as with the first embodiment described above as well as is formed of CBN sinter as a whole.

The cutting insert 4 of the third embodiment is a chip in which only each of four round corners 4a has a positive shape, and another portion has a negative shape. That is, the side surface 7 of each of the round corners 4a is a tapered surface inclined toward the center in a thickness direction of the cutting insert 4. A taper angle of each of the side surfaces 7 is the same as that of the first embodiment described above. Each of the side surfaces 7 except each of the round corners 4a of the cutting insert 4 is perpendicular to each of the principal surfaces 6.

In a central portion of the side surface 7 of each of the round corners 4a of the cutting insert 4, a groove 11 having a substantially V-shape in cross section is formed so as to be recessed with respect to the side surfaces 7. The groove 11 extends in a direction perpendicular to the thickness direction of the cutting insert 4. The shape and dimensions such as a width and a depth of the groove 11 are the same as those of the groove 10 of the first embodiment described above.

When cutting of the work material 2 is performed by using the cutting insert 4 of the third embodiment as described above, the work material 2 is cut by using the cutting edge 8 in any of the round corners 4a. Here, even if the cutting edge 8 on one of the principal surfaces 6 in the round corner 4a breaks to cause a crack to occur in the side surface 7 of the round corner 4a, and the crack extends toward the other of the principal surfaces 6, while the example of work material 2 of high hardness is cut, the crack stops extending in the groove 11. Accordingly, since a crack that occurs due to a break in the cutting edge 8 on one of the principal surfaces 6 in the round corner 4a does not reach the other of the principal surfaces 6, it is possible to prevent the cutting edge 8 on the other of the principal surfaces 6 from breaking.

Figure 9:
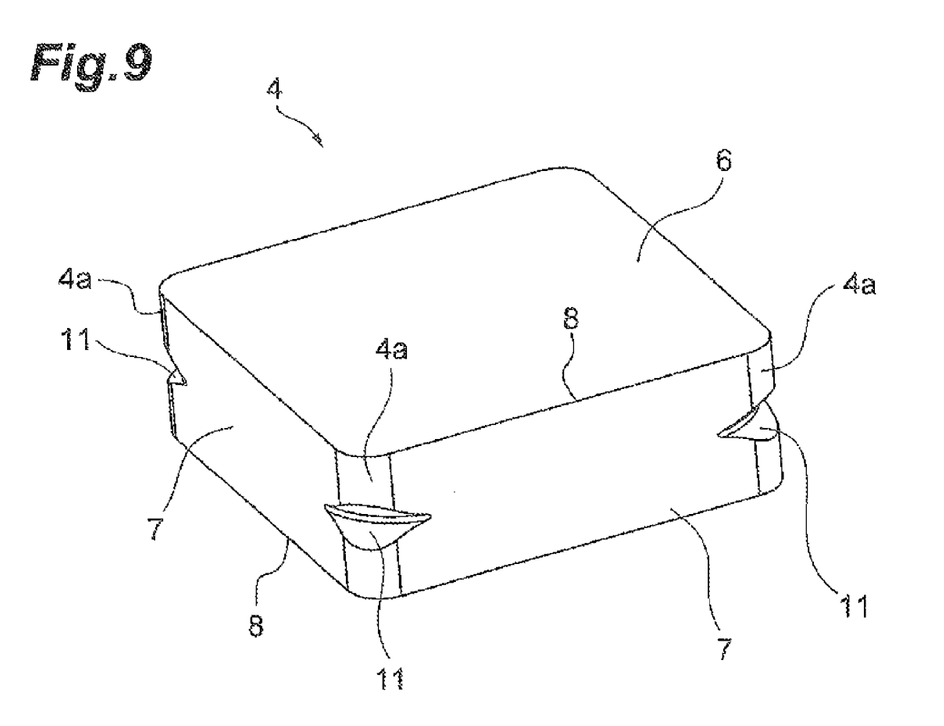
FIG. 9 is a perspective view showing a fourth embodiment of the cutting insert in accordance with the present invention.
Figure 10:
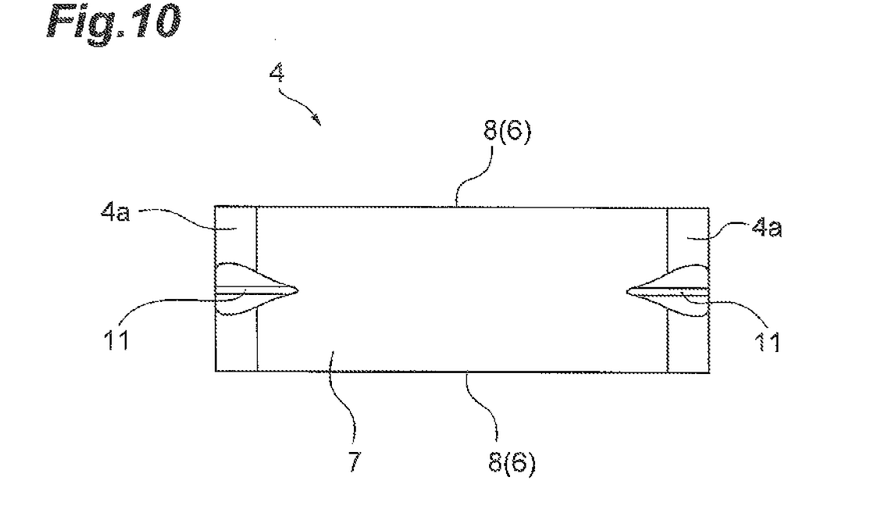
FIG. 10 is a side view of the cutting insert shown in FIG. 9.

FIG. 9 is a perspective view showing a fourth embodiment of the cutting insert in accordance with the present invention, and FIG. 10 is a side view of the cutting insert 4 shown in FIG. 9. In FIGS. 9 and 10, the cutting insert 4 of the fourth embodiment has a substantially regular quadrangular shape in plan view as with the third embodiment described above as well as is formed of CBN sinter as a whole. The cutting insert 4 of the fourth embodiment is a chip that has a negative shape as a whole including the round corner 4a. Another structure is the same as that of the third embodiment described above.

Even in the cutting insert 4 of the fourth embodiment, since a crack that occurs due to a break in the cutting edge 8 on one of the principal surfaces 6 in the round corner 4a does not reach the other of the principal surfaces 6 by absorption by the groove 11, it is possible to prevent the cutting edge 8 on the other of the principal surfaces 6 from breaking.

Figure 11:
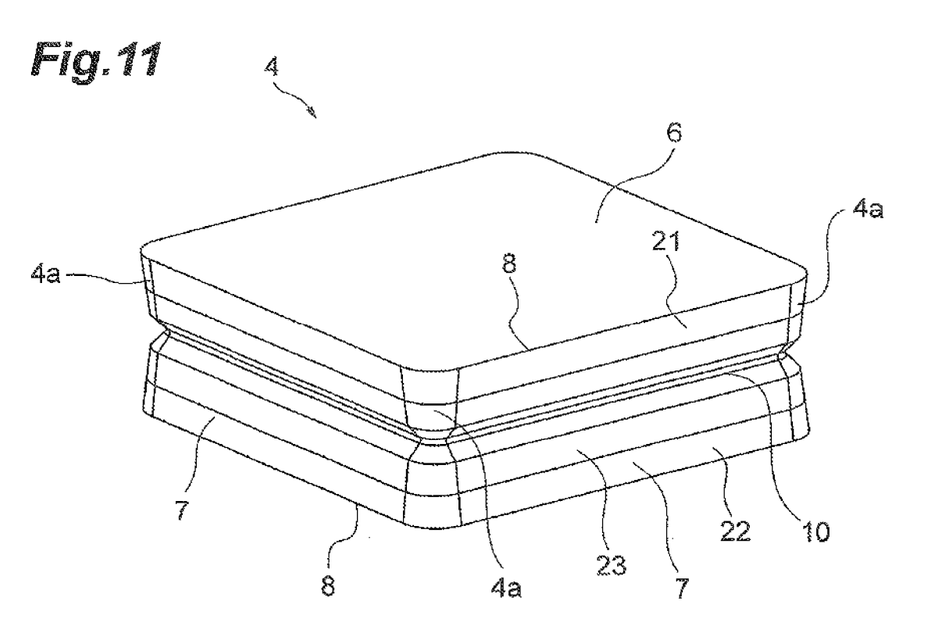
FIG. 11 is a perspective view showing a fifth embodiment of the cutting insert in accordance with the present invention.
Figure 12:
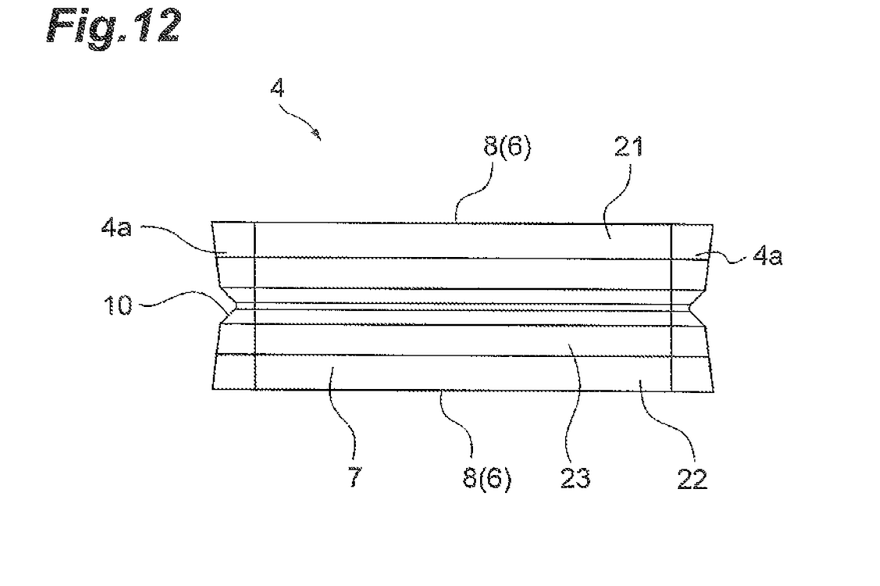
FIG. 12 is a side view of the cutting insert shown in FIG. 11.

FIG. 11 is a perspective view showing a fifth embodiment of the cutting insert in accordance with the present invention, and FIG. 12 is a side view of the cutting insert 4 shown in FIG. 11. In FIGS. 11 and 12, the cutting insert 4 of the fifth embodiment has a substantially regular quadrangular shape in plan view as with the first embodiment described above as well as is a chip that has a positive shape as a whole.

The cutting insert 4 of the fifth embodiment is composed of a CBN layer 21 provided in one of the principal surfaces 6, a CBN layer 22 provided in the other of the principal surfaces 6, and a superhard layer 23 arranged between the CBN layers 21 and 22. Each of the CBN layers 21 and 22 is a layer that is formed of CBN sinter as a whole. Thus, the entire cutting edge 8 is formed of the CBN sinter. The superhard layer 23 is an example of a layer that is formed of cemented carbide. Examples of the cemented carbide include WC-Co sintered in which tungsten carbide and cobalt are mixed.

In each of side surfaces 7 of the superhard layer 23, a groove 10 similar to that of the first embodiment described above is formed all around the cutting insert 4. In this case, it is possible to easily form the groove 10 in a central portion of each of the side surfaces 7 of the cutting insert 4 by using an example of a grindstone.

Even in the cutting insert 4 of the fifth embodiment, since a crack that occurs due to a break in the cutting edge 8 on one of the principal surfaces 6 does not reach the other of the principal surfaces 6 by absorption by the groove 10, it is possible to prevent the cutting edge 8 on the other of the principal surfaces 6 from breaking.

It is needless to say that even in the second to fourth embodiments described above, the cutting insert 4 may include a three-layer structure composed of the CBN layer 21, the superhard layer 23, and the CBN layer 22.

As above, although some embodiments of the cutting insert and the cutting tool, in accordance with the present invention, are described, the present invention is not limited to the embodiments described above. In the example of embodiments described above, although the shape of the cutting insert 4 is a substantially regular quadrangular shape in plan view, the shape of the cutting insert 4 is not particularly limited to the shape above. Thus, the shape may be a substantially triangular shape, a substantially rhombic shape, a circular shape, or the like, in plan view.

In addition, in the embodiments described above, although the groove 10 is formed all around the side surfaces 7 of the cutting insert 4, or the groove 11 is formed in the side surface 7 of each of the round corners 4a of the cutting insert 4, a place of the groove is not particularly limited to the above. Thus, the groove may be formed at any place in the side surface of the cutting insert. In a case where a shape of the cutting insert is a substantially triangular shape or a substantially rhombic shape, in plan view, it is preferable that the groove is formed all around side surfaces of the cutting insert or in a side surface of each of round corners thereof. In addition, in a case where the shape of the cutting insert is a circular shape in plan view, it is preferable that the groove is formed all around the side surface of the cutting insert.

In the embodiments described above, although each of the grooves 10 and 11 is formed in the central portion of each of the side surfaces 7 of the cutting insert 4, the grooves 10 and 11 may be formed at a position away from the central portion of the side surface 7 of the cutting insert 4 if strength of the cutting edge 8 is not greatly reduced.

In the embodiments described above, although the shape of each of the grooves 10 and 11 is a substantially V-shape in cross section, the shape of each of the grooves 10 and 11 is not particularly limited to the above, the shape may be a semicircular shape in cross section or a rectangular shape in cross section.

In the embodiments, described above, although one of the principal surfaces 6 of the cutting insert 4 is pressed by the clamp part 5 so that the cutting insert 4 is held in the holder 3, holding means is not particularly limited to the above. Thus, a clamping recessed portion may be formed in one of the principal surfaces 6 of the cutting insert 4 so that the one of the principal surfaces 6 is pressed by a clamp part inserted into the recessed portion.

REFERENCE SIGNS LIST

1 . . . cutting tool, 2 . . . work material, 4 . . . cutting insert, 4a . . . round corner, 6 . . . principal surface, 7 . . . side surface, 8 . . . cutting edge, 10 . . . groove, 11 . . . groove.

The invention claimed is:

1. A cutting insert for cutting work material, the cutting insert comprising:
   first and second principal surfaces opposite to each other; and
   a side surface connecting the first and second principal surfaces to each other,
   wherein first and second boundary portions between the first and second principal surfaces and the side surface form first and second cutting edges that are formed of CBN sinter as a whole, and
   wherein the side surface is provided with a groove so that the groove is recessed with respect to the side surface,
   wherein the side surface includes first and second surface portions between the first and second cutting edges and the groove respectively, the first and second surface portions forming flank surfaces for a closest cutting edge,
   wherein the groove is formed in a central portion of the side surface, and wherein in a case where a thickness of the insert is indicated as "a", and a width of the groove is indicated as "b", the following expression is satisfied: $(a-b)/2 \geq 1$ mm, and
   wherein angles between the first and second principal surfaces and the side surface are less than 90 degrees.

2. The cutting insert according to claim 1, wherein the groove is formed all around the side surface.

3. The cutting insert according to claim 1, further comprising a plurality of round corners, wherein the groove is formed in the side surface of each of the plurality of round corners.

4. A cutting tool comprising the cutting insert according to claim 1.

5. The cutting insert according to claim 1, wherein the groove has a substantially V-shape in cross section and a bottom of the groove is formed into a round shape.

6. The cutting insert according to claim 1, wherein a thickness of the insert is between 3 mm and 5 mm.

7. A method for manufacturing a product, comprising:
   cutting work material with the cutting insert of claim 1, wherein a feed rate of the cutting insert is set less than a depth of the groove of the cutting insert.

* * * * *